Oct. 17, 1939.  C. McCONNELL  2,176,820
FISHHOOK
Filed Nov. 14, 1938
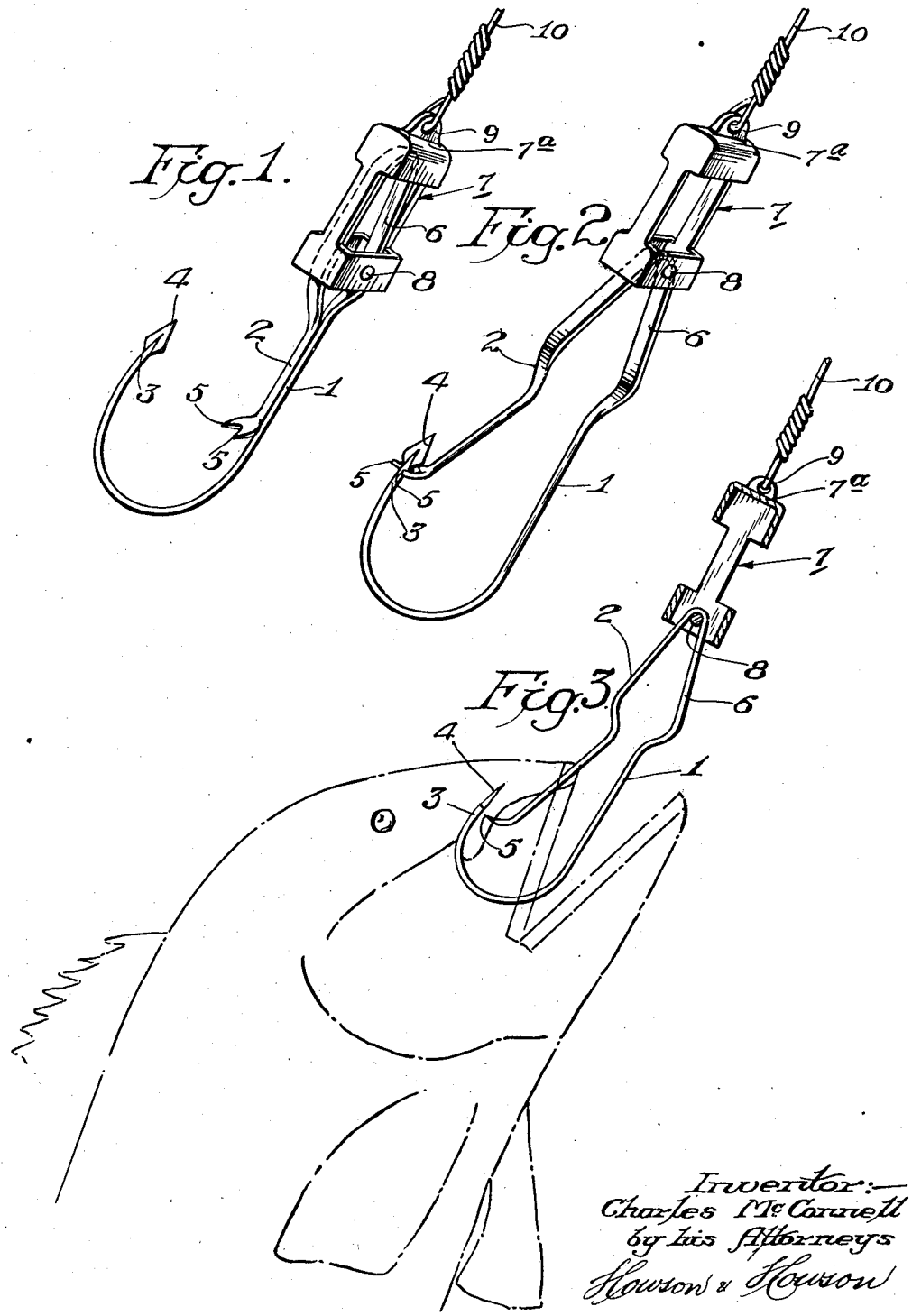
Inventor:—
Charles McConnell
by his Attorneys
Howson & Howson Patented Oct. 17, 1939

2,176,820

UNITED STATES PATENT OFFICE 2,176,820

FISHHOOK

Charles McConnell, Port Norris, N. J., assignor, by direct and mesne assignments, of one-third to Thomas P. Key, Palmyra, N. J., and one-third to Alexander M. Robson, Philadelphia, Pa.

Application November 14, 1938, Serial No. 240,396

3 Claims. (Cl. 43—37)

This invention relates to fish and game hooks and more particularly to what are commonly known as "barbless" hooks.

The principal object of the present invention is to provide a fish or game hook of the character set forth which is constructed and operative to prevent escape of a fish once caught thereon.

Another object of the invention is to provide a fish or game hook of the type described which will not tear the mouth of the fish and is easily removed therefrom.

A further object of the invention is to provide a fish or game hook of the character described which is durable and efficient and which may be manufactured and sold at comparatively low cost.

With these and other objects in view, the invention consists in certain novel features of construction and arrangement hereinafter fully set forth and shown in the accompanying drawing, in which:

Figure 1 is a view in perspective of a fish hook made in accordance with the present invention and showing the same in set or inoperative position prior to catching a fish.

Figure 2 is a view similar to Figure 1 showing the hook in its operative or sprung position after a fish is caught thereon; and Figure 3 is a view in perspective showing the hook in operative or sprung relation with respect to the mouth of a fish caught thereon.

Referring now more particularly to the drawing, in carrying out the invention, a length of suitable spring wire is bent or doubled as shown to form the shank 1 of the hook and a resilient securing element or guard 2. The free end of the shank 1 is curved upon itself to form a bill 3 which is spaced a substantial distance from said shank and provided at its extremity with a barbless spear-like point 4.

The resilient securing element or guard portion 2 normally tends to flex outwardly and its free end is provided small spaced spurs or points 5 which, in the flexed or sprung position of the said guard portion 2, engage the bill 3 at opposite sides thereof just rearwardly of its point 4 as shown in Figure 2 of the drawing.

The bent or doubled end portion 6 of the spring wire is connected to and arranged to be slidably received within a sleeve 7 in such manner that when said bent or doubled portion of the wire is compressed and inserted as far as possible into said sleeve 7, the latter acts to prevent outward flexure of the securing element or guard portion 2 and retain said portion adjacent the shank 1 as shown in Figure 1 of the drawing.

Permanent connection of the hook to the sleeve 7 is effected by means of a pin or the like 8 which extends crosswise of the open end of said sleeve 7 and through the bent or doubled end portion 6 of the wire, and movement of said doubled portion 6 inwardly of the sleeve 7 is limited by the rear or opposite end wall 7a thereof. The outer face of the rear end wall 7a of the sleeve 7 is provided with a bug 9 having an opening therethrough for connection of the usual leader or line 10 as the case may be.

In operation or use the guard portion 2 is flexed inward upon the shank 1 after which the doubled end portion 6 of the hook is inserted as far as possible into the sleeve 7 to retain the guard portion 2 as and in the relation shown in Figure 1. The hook is then baited in the usual manner and the fish, having been impaled upon the point of the bill 3 in an attempt to take the bait, in its effort to escape will pull upon the hook and draw the bent or doubled end portion 6 thereof outwardly of the sleeve 7 thus permitting outward flexing or expansion of the securing element or guard portion 2, whereupon its spurlike points 5 penetrate the mouth of the fish and, in conjunction with the point of the bill 3, securely hold the fish against possible escape. When landed the fish may be readily and easily removed from the hook by merely compressing the guard portion 6 with the thumb and at the same time holding the hook in such position that the fish will fall from the pointed bill portion 3 thereof, a result easily accomplished due to the lack of any barbs thereon.

The present invention provides a fish or game hook having a positive locking action upon the mouth of a fish with the result that a much smaller hook than heretofore possible may be used for larger fish and the use of a less quantity of bait is therefore possible. The spur-like points 5 on the guard portion 2, when the latter is sprung, function or serve to reinforce the bill 3 adjacent the point thereof thus greatly increasing the strength of the hook and, in addition, operate to lock the point of the bill 3 in the boney structure of the jaw of the fish even in instances where the bill does not pass entirely therethrough.

While a particular embodiment of the invention has been herein illustrated and described it is not intended that said invention be limited to such disclosure but that changes and modifications may from time to time be embodied and incorporated therein within the scope of the annexed claims.

I claim:

1. An article of the type described comprising a single wire hook having a shank and bill including a portion bent double at one end to provide a resilient lock portion arranged to normally engage said bill and a sleeve arranged to slidably receive the doubled end portion of the wire and retain the resilient lock portion adjacent said shank and remote from the bill, said doubled end portion of the hook being drawable from said sleeve by the pull of a fish on the hook to permit said lock portion to expand and engage the fish and securely lock the same on said hook.

2. An article of the type described comprising a single wire hook having a shank and bill and including a portion bent double at one end to provide a resilient lock portion arranged to normally engage said bill, a sleeve arranged to slidably receive the doubled end portion of the wire and retain the resilient lock portion adjacent said shank and remote from the bill, said doubled end portion of the hook being drawable from said sleeve by the pull of a fish on the hook to permit said lock portion to expand and engage the fish and securely lock the same on said hook, and a pin extending crosswise of the sleeve and through the doubled end portion of the hook to prevent detachment of the latter from said sleeve.

3. An article of the type described comprising a single wire hook having a shank and a bill and including a portion bent double at one end to provide a resilient lock portion having spaced points at its free end and arranged to normally engage said bill therebetween, a sleeve arranged to slidably receive the doubled end portion of the wire and retain the resilient lock portion adjacent said shank and remote from the bill, said doubled end portion of the hook being drawable from said sleeve by the pull of a fish on the hook to permit said lock portion to expand and engage the fish and securely lock the same on said hook, and a pin extending crosswise of the sleeve and through the doubled end portion of the hook to prevent detachment of the latter from said sleeve.

CHARLES McCONNELL.